Sept. 16, 1958
J. H. BOOTH
2,852,288
JOINT ASSEMBLY
Filed Jan. 13, 1955
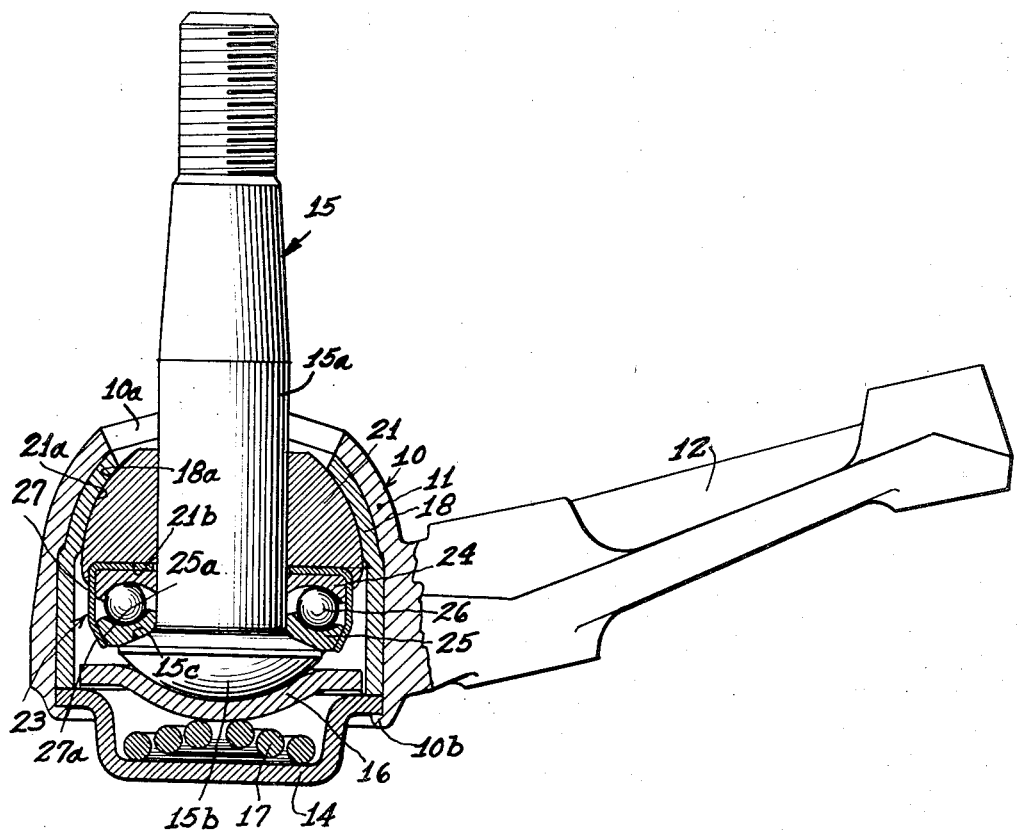
Inventor
JAMES H. BOOTH
by *Attys.*

# United States Patent Office 2,852,288
Patented Sept. 16, 1958

2,852,288

JOINT ASSEMBLY

James H. Booth, Venice Township, Shiawassee County, Mich., assignor to Thompson Products, Inc., Cleveland, Ohio, a corporation of Ohio Application January 13, 1955, Serial No. 481,682

1 Claim. (Cl. 287—90)

The present invention relates to joint assemblies, particularly of the ball joint type employed as load carrying means in tie rods, front end suspensions, and the like. Specifically, the invention deals with socket assemblies of the ball and socket type wherein a ball member receives a stud in rotatable relation therethrough, the ball member and the stud being spaced apart by an anti-friction assembly.

This application is a continuation-in-part of my prior filed applications, Serial Nos. 441,600, filed July 6, 1954, now Patent No. 2,823,055, and 442,981, filed July 13, 1954, now Patent No. 2,797,930.

One of the more recent developments in the type of ball joint wheels suspensions described in my United States Letters Patent No. 2,521,335, has been the employment of a porous, sintered iron composition as a bearing element in such assemblies, the bearing being sufficiently porous to hold a significant amount of lubricant in the pores thereof to lubricate the bearing surfaces on both the stud and its housing. A complete disclosure of this type of sintered metal bearing may be found in my aforesaid copending U. S. application Serial No. 441,600.

While the type of ball point assemblies described in the aforementioned application Serial No. 441,600 function very effectively from an operational point of view, the manufacturing cost, and the time involved in manufacturing were not always as low as might be desired. Accordingly, the present invention was developed with the thought of simplifying the manufacturing procedure involved in make the joint assemblies of the type previously described by providing a ball joint assembly which required no elaborate heat treatment or machining operations for its manufacture.

The present invention includes a caged ball bearing assembly between the stud and bearing element as described in said application, Serial No. 442,981.

With the type of joint assembly provided by the present invention, the stud can be formed from a simple forging, followed by a conventional upsetting operation to provide the enlarged head portion. The only secondary operations required to finish the stud are drilling, threading, and a light heat treatment to provide a light case hardness on the stud. In previous types of ball joint assemblies, it was frequently deemed necessary to provide a substantial depth of case hardness to the stud, since the stud supported the substantial portion of the load. Consequently, it was frequently necessary to carburize or nitride the stud quite extensively in order to achieve the proper hardness to the required depth.

In the joint assembly of the present invention, the stud is combined with a powdered metal bearing preferably of the type described in my aforementioned pending application Serial No. 441,600. Interposed between the headed end of the stud and the end of the powdered metal bearing is a ball bearing assembly consisting of a pair of opposed ball bearing races carrying a plurality of ball bearing elements. Preferably, the ball bearing assembly including the races and the ball bearing elements is enclosed in a thin shell or cage which is received in a suitably recessed portion of the surface of the powdered metal bearing and also against the headed end of the stud. The provision of such a self contained bearing assembly considerably simplifies the manufacture of the joint without sacrifice in its efficiency. Since the ball race in the caged bearing assembly supports much of the load, the extent of the case hardening of the stud can be held to a very low level. Similarly, the spherical powdered metal bearing requires only a light case hardness instead of a hardness sufficient to support the load transmitted by the ball bearing members. As a further advantage, the ball bearing assembly as a unit can be rapidly assembled and locked in position within the joint assembly thereby substantially cutting down the time required for assembly and eliminating the need for special assembly equipment.

With the foregoing in mind, an object of the present invention is to provide an improved joint assembly of the ball and socket type in which manufacturing costs and times are substantially reduced.

Another object of the invention is to provide an improved ball and socket type joint assembly including powdered metal bearings with an improved, self contained ball bearing assembly.

A still further object of the invention is to provide a rugged joint assembly for steering linkages and front end suspensions.

These and other objects and features of the present invention will become more apparent to those skilled in the art from the following description of the attached sheet of drawings in which there is illustrated a preferred embodiment of the invention. The single figure illustrated in the drawings represents a view in elevation, and partially in cross-section of a ball joint wheel suspension embodying the socket assembly of the present invention.

In the drawings:

The socket assembly 10 illustrated in the drawings includes a cup-shaped housing 11 from which extends an integral stem 12 for attachment to a control arm of the suspension. The housing 10 at its upper end is provided with an aperture 10a and, at its lower end, has a peened over edge 10b which securely positions a bottom closure plate 14 at the bottom of the cavity provided in the housing 11.

A stud generally indicated at 15 has a shank portion 15a received within the internal cavity of the housing 11 and, at one end thereof, the stud 15 has an enlarged and rounded dome 15b formed thereon. The dome portion 15b is engaged by a washer or spring seat 16 which is urged into constant engagement with the dome portion 15b by the action of a coiled spring 17 bottomed on the closure plate 14.

The cup-shaped housing 11 also has a stamped metal liner 18 bottomed against the outer peripheral edge of the closure plate 14 and received in snug fitting relationship within the inner wall of the housing 11.

Interposed between the stud 15 and the liner 18 is a sintered porous powdered iron bearing member 21 having a fragmental spherical outer wall 21a tiltable on the converging wall portion 18a of the liner 18. The bearing 21 is also provided with a cylindrical bore extending axially thereof and rotatably receiving the shank 15a of the stud.

The bearing member 21 is preferably molded from iron powder which had been reduced from mill scale. A typical chemical analysis of this powder contains about .08 to .15% carbon, .20 to .50% manganese, a maximum of .04% phosphorus, a maximum of 0.4% sulphur, a maximum of .15% silicon, and about 97% iron. The particle size of the powder, in a typical sample, may include about 16% between 100 and 150 mesh, about 20% between 150 and 200 mesh, about 27% between 200 and 325 mesh, and about 37% smaller than 325 mesh.

The iron powder is compacted in molding dies at pressures within the range of about 15 to 60 tons per square inch. The resulting compacts are sintered in a reducing atmosphere at temperatures sufficient to cause fusion along the grain boundaries of the particles, forming a porous, self sustaining mass. Preferred sintering temperatures vary from about 1400 to 2100° F., and the time of sintering varies in accordance with the size of the bearing. After sintering, the compact may be cold coined in suitable dies equipped with surfaces which will provide the desired finished contours to the finished bearing. For example, in this step, the bearing may be provided with lubricant grooves, and suitably shaped end face grooves. After coining, the porosity of the bearing is usually in the range from about 12 to 15% depending upon the degree of compacting and the coining pressures employed.

After the bearing has been cold coined, it is normally subjected to a carbo-nitriding process which case hardens the surface to the required extent. With the type of bearing assembly employed in the present invention, however, it is not necessary that the case hardening be carried out to as substantial an extent as in other types of bearing assemblies where the outer metal bearing element has to support a substantial amount of the load.

Disposed between the bearing 21 and the headed end 15b of the stud 15 is a ball bearing assembly generally indicated at numeral 23 in the drawings. This assembly includes a pair of oppositely disposed ball bearing races 24 and 25 composed of a sufficiently hard metal to withstand the loading pressures involved during operation of the socket assembly. A plurality of ball bearing elements 26 are disposed between the races 24 and 25. Preferably, the races 24 and 25 have ball-engaging radii of greater dimension than the radii of the ball bearing elements 26. With this arrangement, the ball bearing elements 26 are capable of rising and falling between the races to maintain the same relationship between the bearing 21 and the stud 15 without the necessity of observing close tolerance limits between the parts.

The inner edge of the lower race 25 is preferably beveled as indicated at 25b to cooperate with a beveled surface 15c formed rearwardly of the headed portion 15b. The beveled portion is normally provided on the headed end of the stud as a consequence of the upsetting operation which forms the head, so that no additional machining is required to form an adequate seat for the ball bearing assembly.

In order to greatly simplify the assembly of the socket, the races 24 and 25 and their associated ball elements 26 may be enclosed in a thin, metallic shell 27 having an end wall overlying the upper race 24, a side wall surrounding both races, and an inwardly crimped portion 27a on the side wall which overlies a beveled surface 25a on the lower race member 25. The complete ball bearing unit 23 is received within an annular recess 21b formed in the bearing member 21 preferably during the coining operation previously described. The end wall of the shell or cage 27 is bottomed in the recess 21b. Thus, in assembly of the ball and socket joint, the ball bearing member may be handled as a unit and simply slipped into position over the shank portion 15a of the stud 15. However, the shell 27 does not contribute very substantially to the operating characteristics of the bearing assembly so that if desired, it may be eliminated where the cost of the assembly is to be held to a minimum.

The powdered porous metal bearings are especially well adapted to cooperate with stamped or forged solid metal bearing members to reduce friction, scuffing, and wear. The hard wear resisting bearing walls on the ball bearing races are also cushioned by the softer underlying main body of the powdered metal bearing so that cracking or splitting of the bearing member is prevented.

It will be seen that the present invention provides a simplified, but high effective ball and socket type assembly employing powdered metal bearings. The improved ball bearing assembly used in conjunction with the powdered metal bearing substantially simplifies the problems of manufacture, particularly insofar as machining and heat treatment of the stud and bearing are concerned.

It will be understood that various modifications and variations may be effected without departing from the scope of the present invention.

I claim as my invention:

A load-carrying ball and socket joint adapted for a wheel suspension which comprises a socket member having an internal fragmental spherical bearing wall converging to an opening at one end of the member, a closure plate secured in the other end of the socket member for closing said end, a sintered powdered metal ball member tiltably mounted in said socket member on said spherical bearing wall and having an axial bore therethrough registered with said opening together with a recessed end in said ball member remote from said opening, an upset metal stud member having a cylindrical shank portion extending through said axial bore and projecting freely through the opening of the socket member, said stud member having an enlarged domed head portion with a conical shoulder connecting the shank portion to the periphery of the head portion and facing the recessed end of the ball member, a retainer in said socket member having a depressed central portion receiving the domed end of the stud head in bearing relation, a spring between the closure plate and the retainer holding the retainer against the domed end of the stud, and a caged ball bearing assembly between the conical shoulder of the stud and the recessed end of the ball member, said assembly including a first hard metal race ring with a conical outer end seated on said conical shoulder in mated relationship therewith and a raceway around the opposite end of said race ring having a transverse radius, a second hard metal race ring having an outer end and a recessed raceway around the opposite end with a transverse radius, a cage embracing both race rings and having an end wall overlying the second race ring bottomed in the recess of the ball member, a side wall partially embraced by the ball member and an inturned flange on said side wall embracing the first race ring to hold the assembly together, a ring of ball bearings between the race rings bottomed on said raceways thereof, the radii of said raceways being greater than the radii of the ball bearings to accommodate rising and falling movement of the ball bearing between the raceways, whereby said ball member is adapted to freely tilt in said socket member to carry the caged ball assembly and stud therewith as the domed head of the stud tilts in the retainer and said stud member is freely rotatable in said ball member without scuffing the stud member while the hard race rings are cushioned on the powdered metal ball member to minimize cracking or splitting.

References Cited in the file of this patent

UNITED STATES PATENTS

| | | |
|---|---|---|
| 2,193,713 | Cole | Mar. 12, 1940 |
| 2,224,704 | Stein | Dec. 10, 1940 |
| 2,230,471 | Stein | Feb. 4, 1941 |
| 2,521,335 | Booth | Sept. 5, 1950 |
| 2,625,452 | Haller | June 13, 1953 |

FOREIGN PATENTS

| | | |
|---|---|---|
| 683,402 | Great Britain | Nov. 26, 1952 |
| 1,040,809 | France | 1953 |